United States Patent [19]

Bulkley

[11] 3,800,451
[45] Apr. 2, 1974

[54] MOVING ARTISTIC DISPLAY DEVICE

[76] Inventor: Dewey Bulkley, 1176 N. 75 East, Orem, Utah 84057

[22] Filed: Oct. 14, 1971

[21] Appl. No.: 189,301

[52] U.S. Cl............... 40/34, 40/31, 40/132 E, 40/132 G, 240/10.1
[51] Int. Cl............................................ G09f 11/04
[58] Field of Search ............. 35/2, 49, 50, 53; 40/30–34, 78.03, 84, 106.51, 106.52, 106.53, 130 R, 132 D, 132 F, 132 G, 52 R, 77; 350/167; 240/2 AD, 10.1

[56] References Cited
UNITED STATES PATENTS

| 3,245,163 | 4/1966 | Allen | 40/34 |
| 2,432,896 | 12/1947 | Hotchner | 40/132 G |
| D65,493 | 8/1924 | Richards | 350/167 X |
| 275,450 | 4/1883 | Wrightsman | 40/28 R |
| 2,360,536 | 10/1944 | Avery | 40/34 |

Primary Examiner—Robert W. Michell
Assistant Examiner—Vance Y. Hum

[57] ABSTRACT

A moving artistic display device comprising a box-like structure having in its front wall a circular viewing window covered by a transparent doubly-fluted glass through which is viewed a lighted, multi-colored design arranged to be rotated in a plane parallel to that of the glass. In one embodiment the design is formed on a disk mounted behind the glass on a circular, motor-driven platform, while in another embodiment the design appears on an elongated, web-like strip which is adapted to be fed back and forth between rollers mounted on the rotating platform, thus varying the pattern of the rotating design as viewed through the fluted glass window. In operation, the simulated lenticular lenses present in a glass of this character pick up and exaggerate the color patterns of the rotating design and thus provide an ever-changing, eye-catching display.

3 Claims, 5 Drawing Figures

INVENTOR
DEWEY BULKLEY

BY: Donovan J. DeWitt

ATTORNEY

PATENTED APR 2 1974

INVENTOR
DEWEY BULKLEY

BY: Donovan J. DeWitt

ATTORNEY

MOVING ARTISTIC DISPLAY DEVICE

SUMMARY OF THE INVENTION

This invention relates to a device arranged to present an attractive display of ever-moving color patterns. It takes the form of a box-like structure having a front wall which is provided with a circular viewing window which is covered with a transparent glass of the double fluted type. The structure of this glass is such that one surface thereof has spaced undulations running in one direction, while the other surface has similarly spaced undulations running at a right angle to those on the opposite face. The spacing from the midpoint of one undulation to that of adjacent undulations ranges from about one half to about 1 inch, with a spacing of about 1 inch being preferred in this invention. A glass of this doubly-fluted type provides an overall checker board-like pattern of simulated lenticular lenses each of which is from about one half to 1 inch square, depending on the spacing of adjacent flutes, or undulations.

The device is provided with a rotatably mounted, motor-driven platform to which access is gained by opening the back of the device, said platform being adapted to support a sheet, which is provided with the desired multi-colored design, in a position immediately back of the viewing window and in parallel alignment with the covering glass. The space between the design and the rear surface of the glass can vary, and is generally a function of the size of the individual lenticular lenses in the glass. Thus, in the case of a one-half inch lensed glass the spacing can be from about one half to about 1½ inches, while with a 1 inch lensed glass the spacing can be from about 3 to about 5 inches.

In one embodiment of the invention the design to be viewed is painted or otherwise provided on the surface of a round sheet of stiff paper. The resulting disk-shaped design has a center hole adapted to receive the central threaded spindle of a motor-driven, round supporting platform which is rotatably mounted in the structure at the desired distance behind the viewing glass. This platform can be mounted upon the inner surface of the rear wall of the structure which swings open to provide access to the platform so that the one design can be replaced with another. These disks can be removed, or tightened into place against the face of the platform, by loosening or tightening a wing nut which is threaded upon the spindle of the platform. With the design thus in place, and the back of the structure closed, the platform can be rotated by a motor at the desired speed which is usually one of from about one sixth to 6 revolutions per minute.

In order to properly illuminate the design, incandescent or so-called "black" light fixtures can be placed inside the structure in the preferred embodiment of this invention. However, the lighting employed can also be positioned outside of the unit so as to properly light the design which is seen turning behind the viewing window. Sunlight can also serve the desired illuminating function when available.

In another embodiment of the invention, the design is provided on a relatively long paper web which is carried between a pair of opposed, motor-driven rollers mounted parallel to one another upon opposite sides of the circular, moter-driven platform which is rotatably mounted in the structure rearwardly of the glass. As the platform, and with it the design-bearing web carried thereon, is rotated behind the viewing glass, fresh portions of the design can be brought into view as the web is continuously or intermittently unrolled from one roller and taken up by the other.

The nature of the present invention will be the more clearly understood by reference to the figures of the accompanying drawings wherein, FIG. 1 is a rear view in elevation, with the back wall removed, of the display device of this invention in an embodiment thereof wherein the design mounted for rotation behind the viewing glass can be advanced from one roller to another;

Figure 2:
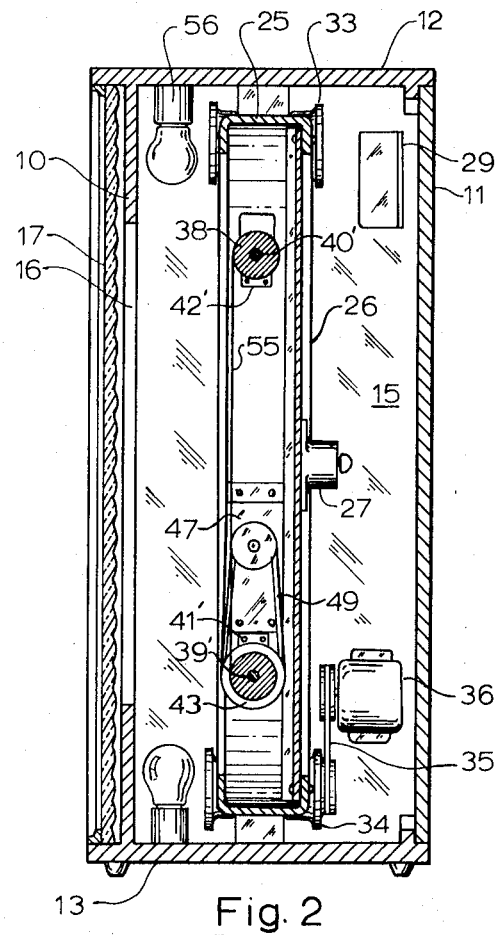
FIG. 2 is a sectional view taken along the line 2—2 of FIG. 1.
Figure 4:
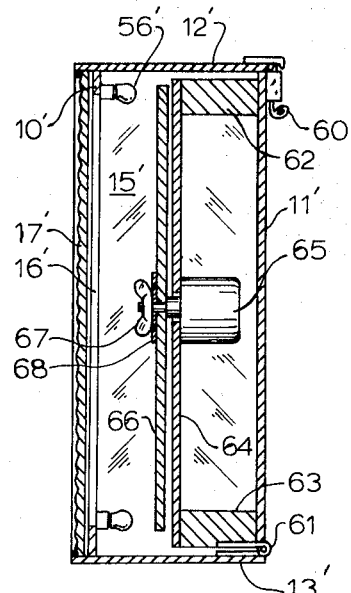
Figure 5:
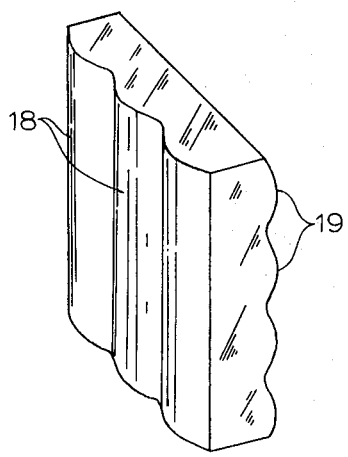

FIG. 4 is a sectional view, similar to that of FIG. 2, but of another embodiment of the invention wherein the design mounted for rotation behind the glass is carried on a removably mounted disk; and FIG. 5 is a view in perspective of a section of the doubly-fluted viewing glass and showing the spaced undulations, running transversely to one another on the two sides of the glass, which collectively form the lenticular lens pattern in the glass.

Figure 3:
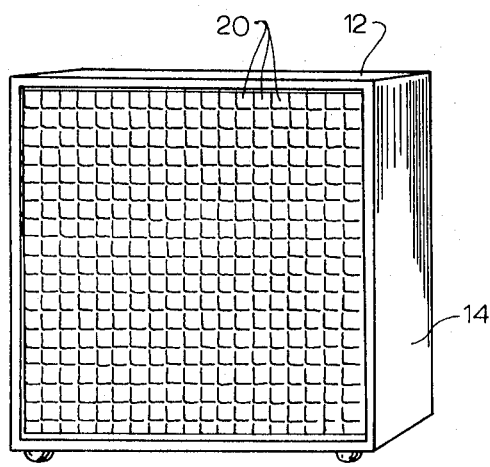
FIG. 3 is a view in perspective of the front side of the device of this invention and showing the checker board pattern of lenticular lenses present in the viewing glass.

Referring more particularly to the drawings, there is shown a box-like structure having a front wall 10, a rear wall 11, top and bottom walls 12 and 13, and side walls 14 and 15. The front wall is provided with a circular window opening 16 over which is fitted a doubly-fluted, transparent viewing glass 17. Spaced flutes 18 are shown on one side of the glass in FIG. 5, while those on the other side of the glass are indicated at 19. The simulated lenticular lens pattern which is formed in the glass by these flutes is indicated at 20 in FIG. 3.

Figure 1:
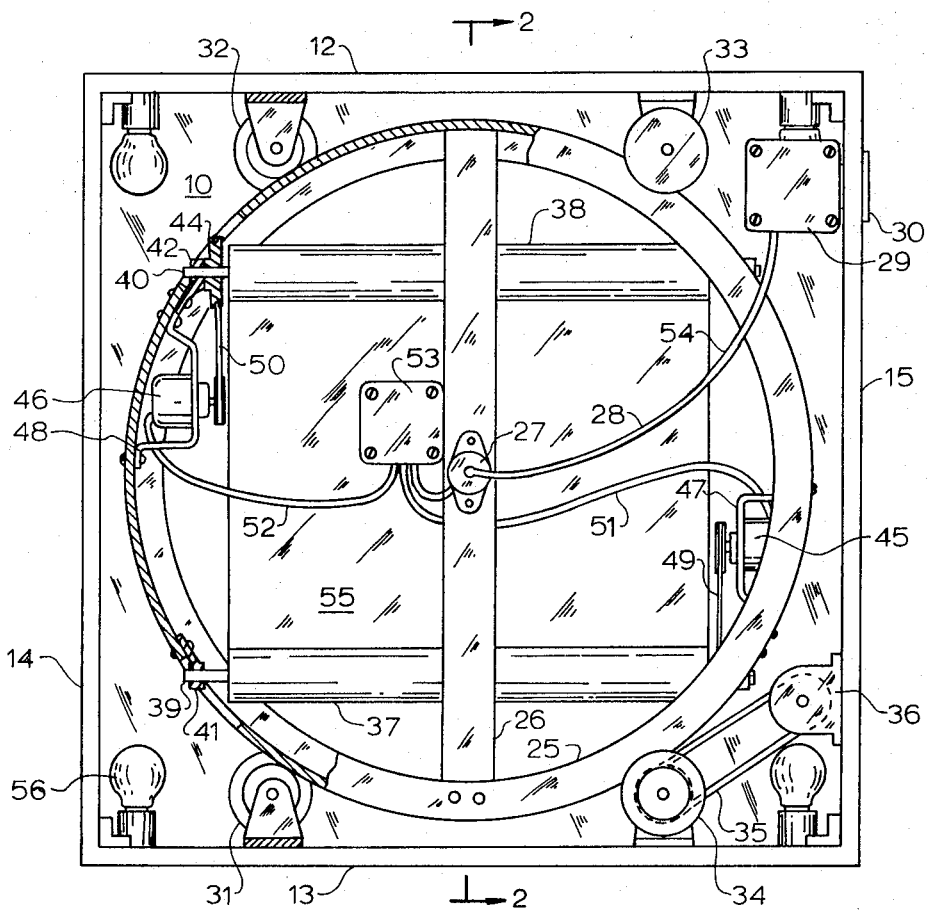

Referring now to FIGS. 1 and 2, there is shown a channel ring 25 (partially cut away in FIG. 1) which is provided with transverse channel member 26 serving to support an electrical slip ring assembly 27 which is connected through wire lead 28 to junction box 29 having a bayonet socket 30 through which electrical power is supplied to the unit. Ring 25 is held into place and rotatably mounted by idler rollers 31, 32 and 33 and by a driven roller 34, all supported by the top and bottom walls of the device. Roller 34 is connected via belt 35 to electrical motor 36, mounted on side wall 15. This motor receives its power through junction 29 and may be controlled by suitable switch means, (not shown) if desired. In operation, actuation of motor 36 causes ring 25 to rotate, thus carrying with it channel 26 and the assemblage of motor-driven, design-supporting rollers as described below.

Channel 25 serves as a platform on which to mount a pair of opposed, parallel rollers 37 and 38 having pin-like end pieces 39,39' (roller 37) and 40,40' which are journalled within bearings 41,41' (roller 37) and 42,42', all as set within the peripheral wall of the ring 25. The end pieces 39' and 40 are provided with fixed pulleys 43 and 44, respectively. Electrical motors 45 and 46, mounted on brackets 47 and 48, respectively, affixed, as shown, to the inner surface of the peripheral wall of ring 25, serve to turn one or the other of the rollers 37 or 38 through belts 49 or 50. Power is supplied to these motors through leads 51 and 52 connected to a junction 53 and, through lead 54, to assembly 27 and junction 29. Appropriate switch means (not shown) of the desired type can be employed to actuate one or the other of the motors 45 and 46 as it is desired to wind a design-bearing sheet 55 carried between rollers 37 and 38 in one direction or the other. The planes of ring 25 and sheet 55 parallel that of the glass 17. Said elongated sheet, which can be comprised of paper, cloth or other design-bearing material, is mounted to said rollers at its respective ends, and, being appreciably longer than the distance between the rollers, the slack in the sheet is taken up on first mounting the assembly by winding the excess length on one or both of the rollers as they are relieved of motor drag.

In operation, the design present on a given length of sheet 55 will be visible through window 16 as the ring 25 and its associated structure are rotated by motor 36 at the desired speed. The portion of the design in such view can be changed, as it rotates in this fashion, by actuating one or the other of motors 45 or 46. Such change can be intermittent or continuous. In the latter mode, appropriate switch means responsive, for example, to increased tension as the sheet becomes fully unwound from a given roller, can then automatically disengage the one motor and actuate the other, thus reversing the direction of travel of the design-bearing sheet.

The better to view the design, lights 56 can be placed at one or more locations within the structure between sheet 55 and window 16, said lights receiving their power through leads (not shown) from junction 29. It is also contemplated that speakers may be mounted within the structure, if desired, in order that musical or other sounds may emanate therefrom along with the visual display.

Referring now to the embodiment of the invention which is shown in FIG. 4 there is illustrated a box-like structure having a front wall 10', a back wall 11' and top and bottom walls 12' and 13', respectively. One side of the structure is shown at 15'. The front wall is provided with a window 16', and a doubly-fluted glass 17' is shown as covering the window. With the release of a catch 60, back 11' is adapted to swing down along hinge 61. As it opens in this fashion, the back carries with it the attached supporting assemblage made up of cross pieces 62 and 63 and connecting member 64. The latter serves to support an electrical motor 65, the shaft of which extends through a circular platform 66 affixed thereto whereby the said platform makes one full turn for each turn of the motor shaft. Here, as with the several motors shown in the embodiment of FIGS. 1 and 2, it will be realized that the motor includes a reducing gear assembly in order that the shaft supplying the power may turn at the desired, relatively slow rate of speed. The external end of the shaft of motor 65 is threaded and is adapted to receive a wing nut 67. As this nut is removed, there is slipped over the shaft a disk-shaped design having a center hole which fits over the shaft. This design disk, a small portion of which is indicated at 68, can then be secured against the platform for rotation therewith on actuation of motor 65 by applying the nut 67 and screwing the same firmly against the disk. Lights 56' are shown, these lights and the motor 65 being supplied with current by conventional means, not here shown, but generally illustrated in the other figures. In this embodiment of the present invention, changes in the design being viewed through window 16' can be made by opening the back of the structure and substituting another design for that presently mounted on the platform member 66.

In a preferred practice of this invention, the motors employed are both reversable and of variable speed. This is of particular importance in the case of the motors 45 and 46 which advance the sheet behind the viewing window, though it is also desirable for motors 36 and 65 which rotate the design-bearing platforms 25 and 66.

It can be noted that the effect on the observer using a device of the present invention is not only pleasant and interesting. Thus, in many cases it has been found that appropriate designs, coupled with optimum speeds of rotation of the design and the like, can effectively reduce tension and stress in the observer and thus contribute to his relaxation.

I claim:

1. An artistic display device comprising, a box-like structure having upstanding front and rear walls and connecting side, top and bottom walls, said front wall incorporating a circular viewing window; a transparent glass of the doubly-fluted type covering said window; a generally circular platform mounted within the structure behind said window, the plane of the platform paralleling that of the glass; design-engaging means carried by said platform and comprising a pair of opposed, motor-driven rollers mounted on opposite sides of the platform, said rollers being adapted to receive and mount for viewing through the viewing window, an elongated design-bearing sheet and to feed the same back and forth from one roller to the other as the platform is rotated; and motor means mounted within the structure and adapted to rotate said platform and the design-engaging means carried thereon.

2. The device of claim 1 wherein lighting means are mounted within the structure in a position to illuminate the design as the latter is rotated behind the viewing window.

3. The device of claim 2 wherein the motors driving the design-mounting rollers are of the reversable, variable speed type.

* * * * *